United States Patent [19]

Wertitsch et al.

[11] Patent Number: 5,157,885
[45] Date of Patent: Oct. 27, 1992

[54] DOOR LEAF OR CASING FRAME AND PROCESS FOR ITS MANUFACTURE

[75] Inventors: Werner Wertitsch; Siegfried Rock, both of Vienna, Austria

[73] Assignee: Contacting Gesellschaft fur Wirtschaftskontakte Gesellschaft m.b.H., Austria

[21] Appl. No.: 313,973

[22] PCT Filed: Aug. 3, 1987

[86] PCT No.: PCT/AT87/00042
§ 371 Date: Feb. 9, 1989
§ 102(e) Date: Feb. 9, 1989

[87] PCT Pub. No.: WO88/01005
PCT Pub. Date: Feb. 11, 1988

[30] Foreign Application Priority Data
Aug. 1, 1986 [AT] Austria ................. 2088/86

[51] Int. Cl.⁵ .................................. B25G 3/36
[52] U.S. Cl. ......................... 52/656; 403/402
[58] Field of Search ............... 52/656, 657, 658, 476, 52/397, 769, 720, 172; 403/401, 402, 403

[56] References Cited

U.S. PATENT DOCUMENTS

| | | | |
|---|---|---|---|
| 1,817,162 | 8/1931 | Mulligan | 403/401 |
| 2,983,969 | 5/1961 | Meussel | 52/397 |
| 3,534,490 | 7/1968 | Herbert | 403/401 |
| 3,899,258 | 8/1975 | Matthews | 52/656 |
| 4,023,293 | 5/1977 | Murray | 403/401 |
| 4,240,765 | 12/1980 | Offerdinger | 52/656 |
| 4,624,091 | 11/1986 | Biro | 52/656 |
| 4,924,649 | 5/1990 | Taylor | 52/656 |
| 5,011,323 | 4/1991 | Liuo | 403/402 |
| 5,028,165 | 7/1991 | Schools | 403/402 |

Primary Examiner—David A. Scherbel
Assistant Examiner—Michele A. Van Patten
Attorney, Agent, or Firm—Ladas & Parry

[57] ABSTRACT

A door leaf or casing frame for windows, doors or the like and a process for preparing the same. The door leaf or casing frame is assembled by joining hollow sections (3-6; 7-10) and T-pieces with the use of a binder; the hollow sections are particularly of Duroplastic with longitudinally extending reinforcing fibers. A joint plate is disposed in the connecting joints or mitre joints (15, 15a) of the frame corners, said plate having through channels for the binder, T-pieces being integrated with the joint plate. In the production of the frame a glue or adhesive composition is sprayed through the channels of the joint plates into the gap in the area of the corresponding corner.

11 Claims, 4 Drawing Sheets

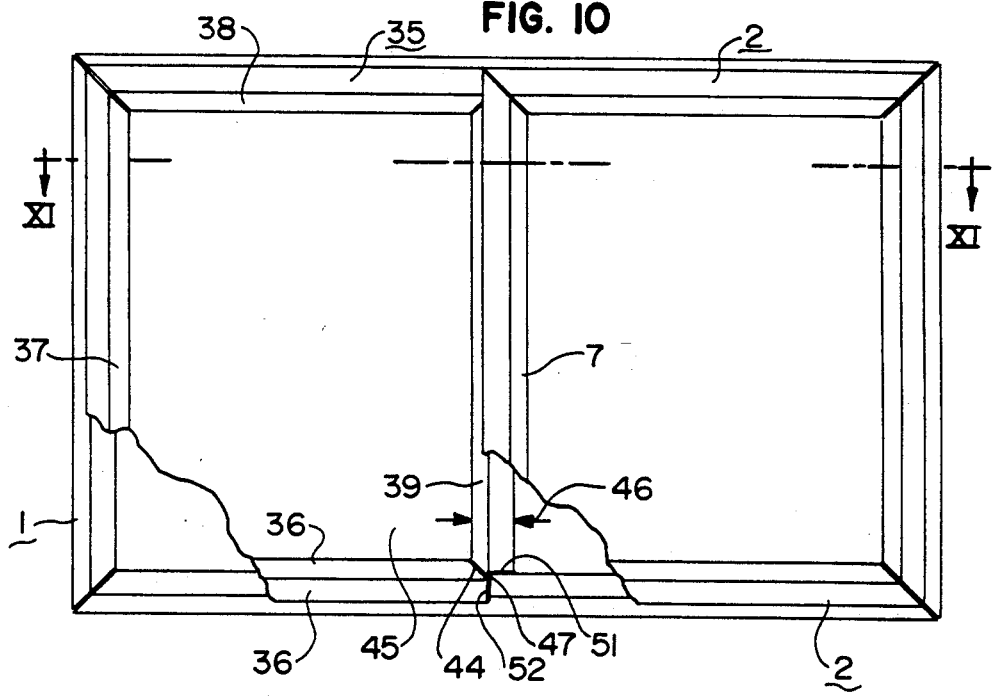
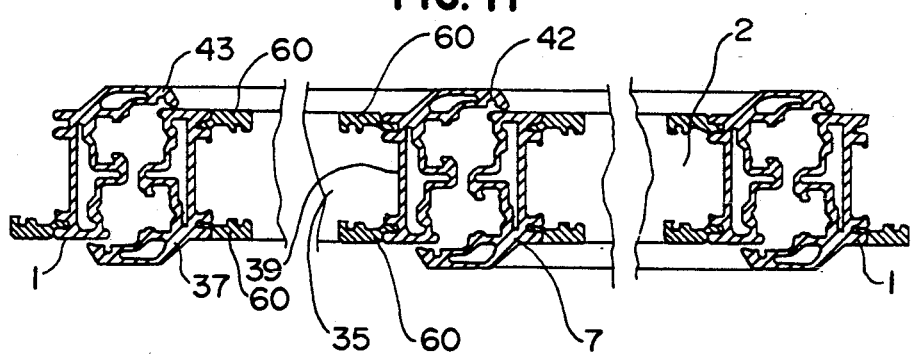
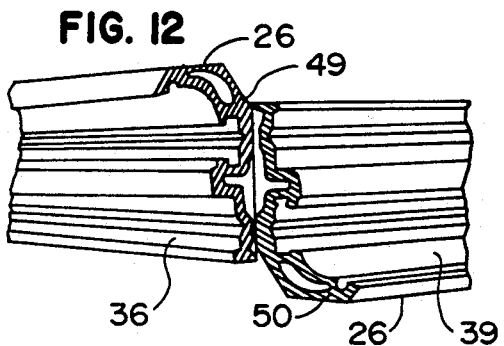
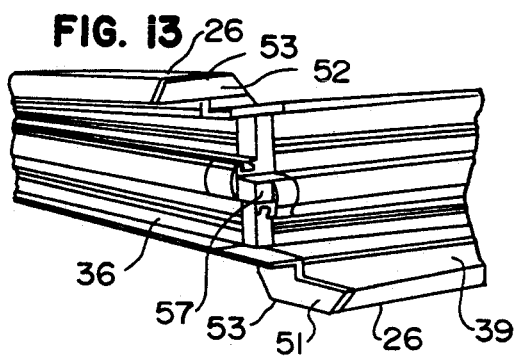

DOOR LEAF OR CASING FRAME AND PROCESS FOR ITS MANUFACTURE

The invention relates to a door leaf or casing frame, assembled of hollow sections and corner connecting angles by a linking means, the frame profiles being in particular reinforced plastic profiles, in which frame a joint plate is disposed in the linking joints or mitre joints of the frame corners and the corner connecting angles are integrated with said joint plates. Particularly considered here are frames of reinforced plastic profiles, having longitudinal reinforcing fibers, particularly glass fibers; such profiles can also comprise reinforcing fibers extending in transverse direction or nondirectionally disposed, particularly glass fibers; the DUROPLASTIC profiles can also comprise only nondirectionally disposed reinforcing fibers, particularly glass fibers.

A frame of such kind is known from British A 2 150 182. Reinforcing bars of metal are disposed in this known frame in the plastic hollow sections, and the T-pieces are screwed together with said reinforcing bars. The use of a binder is only additionally considered. High expense is involved in providing the reinforcing bars and in the screwing of the corner connecting angles with said bars; also much time is involved in producing such frames.

The object of the invention is to provide a leaf or casing frame of the described kind, where the corner joints can be produced in a simple way and provide satisfactory stability and long service life. Such characteristics are particularly desirable in Duroplastic frame profiles with longitudinally extending reinforcing fibers. The technique to be created must above all make possible the processing of plastic profiles of glass reinforced polyester plastic to provide stable and durable door leaf or casing frames for windows, doors, or the like.

The door leaf or casing frame of the above kind is characterized in the invention in that channels are provided in each joint plate leading to the places where the corner connecting angles are disposed; said channels being connected to each other and to at least one opening on the circumference of the joint plate. This design can very well satisfy the objective outlined above. This design can also provide without any problems good distribution of the binder over the areas where the corner connecting angles and the joint plates abut the hollow sections, thus securing a durable joining. It is possible in this connection to apply to the joining areas a gluing or adhesive composition in a single spraying step.

A preferred embodiment of the frame of the invention is characterized in that the joint plate extends up to the sight areas of the frame. This achieves a satisfactory fully planar distribution of the binder over the intersecting areas of the hollow sections located on the corners of the frame and the joining of the joint plates with the hollow sections covering said intersection areas; this is important not only for good stability of the joint, but it also takes care of good sealing of the intersection areas of the hollow sections of the frame against ambient influences. On the intersecting areas of the profiles the ends of reinforcing fibers provided in the profiles are to a lesser degree protected by the plastic forming the profiles and by protecting said areas against ambient influences the service life is significantly extended. An embodiment particularly advantageously provided for achieving good sealing of the intersecting areas of the door leaf or casing frames on the connecting or mitre joints is characterized in that the joint plate has edge ribs at least on the peripheral sectors extending along the sight areas of the frame, said ribs extending to the side and covering the peripheral edges of the hollow sections. This also provides good protection for adhesives or binders which are inserted for joining parts at the corners of the frames against harmful ambient influences. This embodiment achieves also in a simple way a pleasing appearance of the connecting or mitre joints by overlapping or covering the peripheral edges of the hollow sections by the sidewise extending edge ribs of the joint plate. It is also advantageous to provide an edge transversely raised and arched to the peripheral direction on the periphery of the joint plate with a side transition into the projecting edge ribs. It is particularly advantageous if the joint plate is of thermoplastic material, preferably thermoplastic polyester. This embodiment makes it possible in a very simple way to provide a connection of the edge of the joint plate to the peripheral edges of the hollow sections wherein a joint plate outwardly extending over the circumferential edges is inserted in the corner and the edge of the joint plate is then softened by heat and pressed against and over the edges of the profiles. Profile tolerances and machining tolerances are thus advantageously equalized.

The invention also relates to a process for preparing a door leaf or casing frame of the described kind, characterized in that hollow sections which together form corners are joined with corner connecting angles integrated with a joint plate; before or after such joining at least one opening in the hollow sections is provided at one place located on the channels of the joint plate of the corresponding corner and that thereafter a hardening glue or adhesive composition is injected into the split between the hollow sections and the corner connecting angles and joint plates in the area of the connecting or mitre joint. In such way the parts to be joined in the area of the frame corners can be quickly and safely fixed to each other, since in injecting the glue or adhesive with the application of adequately high pressure and adequately flowable glue or adhesive, the split between the areas to be connected can be well filled, such injection of the glue or adhesive taking place without excessive work. Basically, a one-component mass in the form of a thin layer or sufficiently quickly hardened by heat can be used as a glue or adhesive. But it is in many cases recommended for a quick course of the hardening step to use a glue or adhesive mass hardening by a hardener; the hardener of the mass can be added just before the injection into the corner joint. To avoid disturbances in the instrument injecting the mass, care must be taken for pliable passage of the mass mixed with the hardener, since in case of delays the mass may harden in the injection device. To eliminate this risk according to the embodiment of the process of the invention, it is advantageous before injection of the glue or adhesive into the corner joint or before the joining of the hollow sections with the corner connecting angles to apply a hardener on the areas to be connected. Such application is e.g. by smearing or spraying, and then the glue or adhesive is injected without adding the hardener; then in the process of injection the previously applied hardener is joined to the glue or adhesive and the mass becomes rigid. Another advantageous embodiment of the process of the invention is characterized in that a hardening glue or adhesive and a hardener or hardening accelerator are sprayed at the same time. The spraying can possibly take place over two openings connected to each other.

The technique of the invention makes it possible to provide in a simple way so-called sheath frames, i.e., leaves of two-leaf windows, which support a buffer strip for the buffer of the second window leaf. Such embodiment of the leaf frame of the invention is characterized in that the frame is a rectangular sheath frame having joined hollow sections of equal cross section, one of the hollow sections, namely the sheath section, being disposed turned by 180° around its geometrical longitudinal axis relative to the in the frame oppositely located hollow section; the mitre joints located at the ends of the sheath frames extending only over a portion of the width of the profile abutting the inside of the frame, the areas of the hollow sections joined on these mitre joints and bordering thereto to the outside are ending away from the mitre joints with plane end areas extending transversely to the longitudinal axis of the corresponding hollow sections, and that in each case two plate parts at right angles are joined to joint plates in both mitre joints located at the end of the sheath part, said plate parts abutting the plane end areas of the hollow sections extending transversely to the longitudinal axis of the corresponding hollow sections and being connected to said end areas. It is advantageous in this connection that the edge of these plate parts follows the edge of the said end areas of the hollow sections at least on the outer or sight areas of the profiles. It is also advantageous if these plate parts are connected to each other by a profiled transition body between these plate parts. The profile contour of this transition body toward one side is aligned with the profile contour of one of the hollow sections coming together on the respective sheath corner and toward the other side is aligned with the profile of the other of these hollow sections. The presence of the joint plate and the presence of the plate parts abutting the end areas of the hollow sections with the transition body provides stable corner connections at the end of the sheath frame, good closure of the front areas of the hollow sections, and also in the area of the sheath corners good sealing of both leaf frames together and with the casing frame. If so needed, the corner connecting angler can be bent at right angles on the sheath's corners, i.e., the arms of such angles relative to each other are transversely offset to the frame plane. It is also advantageous, in order to still better improve the corner connection on the sheath corners to have shoulders abutting the end areas of the plate parts on the hollow sections, such shoulders being inserted into the hollows of said hollow sections.

In order to design the corner connections precisely to measure and also in order to increase the stability of the corner connections, it is advantageous to provide that a corner connecting angler be disposed on a place on the circumference of the profile cross section of both hollow sections joined at the corresponding corner of the leaf, such corner connecting angler preferably sitting on a place on the inner side of the frame of the circumference of the profile cross section. This embodiment provides that the outer area of a plastic hollow profile can be more easily machined precisely to measure than the wall areas of the profile hollow sections.

The invention will now be described as diagrammatically illustrated in the accompanying drawings.

FIG. 8 is a representation corresponding to

Figure 7:
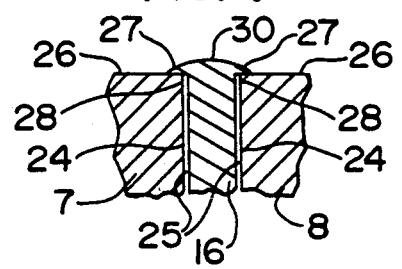
FIG. 7 is a cross section of an edge zone with inserted joint plate.

FIG. 7 of such connecting plate with inserted joint plate at a stage of producing the connection.

Figure 9:
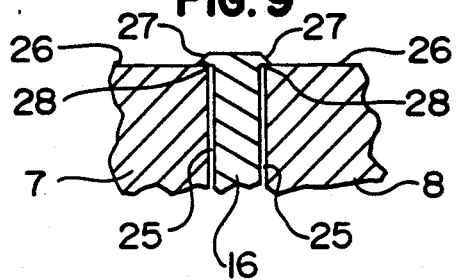

FIG. 9 shows this area after connection is completed.

FIG. 10 shows in one view a casing frame engaged by two leaves, namely a sheath frame and a conventional door leaf.

FIG. 11 shows this frame in cross section along line XI—XI of FIG. 10.

FIG. 12 is a view of hollow sections to be joined on a sheath corner to a sheath frame without connecting elements, and FIG. 13 shows likewise in one view the sheath frame corner provided with connecting elements.

Figure 1:
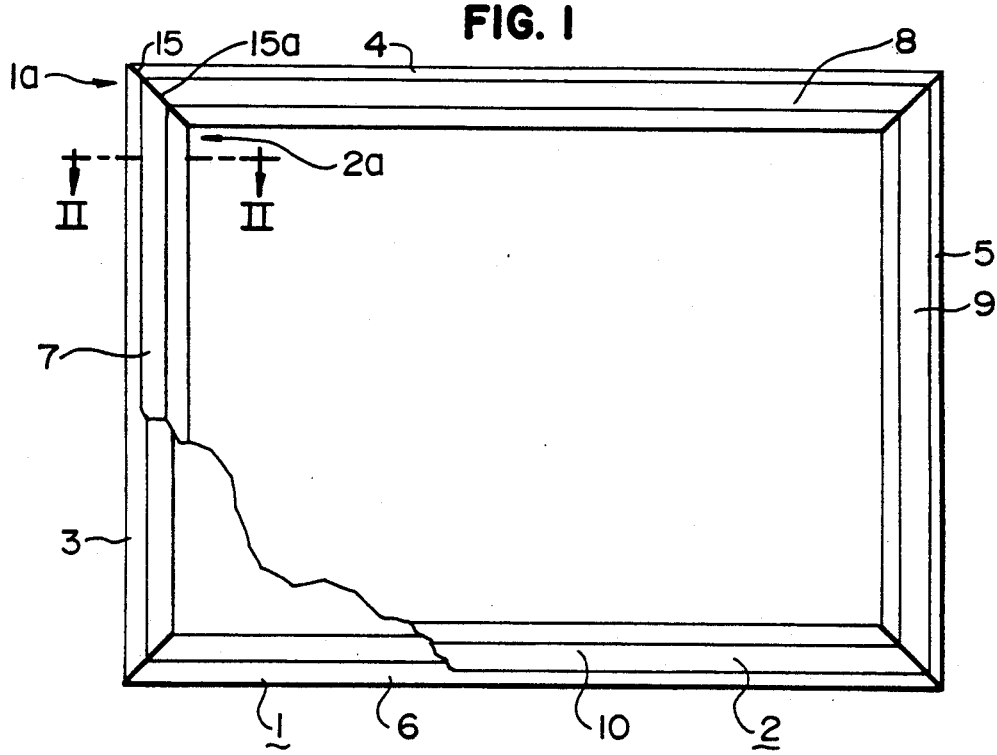
FIG. 1 shows the front view of a casing frame and a leaf frame associated with said casing frame and engaging said casing frame.
Figure 2:
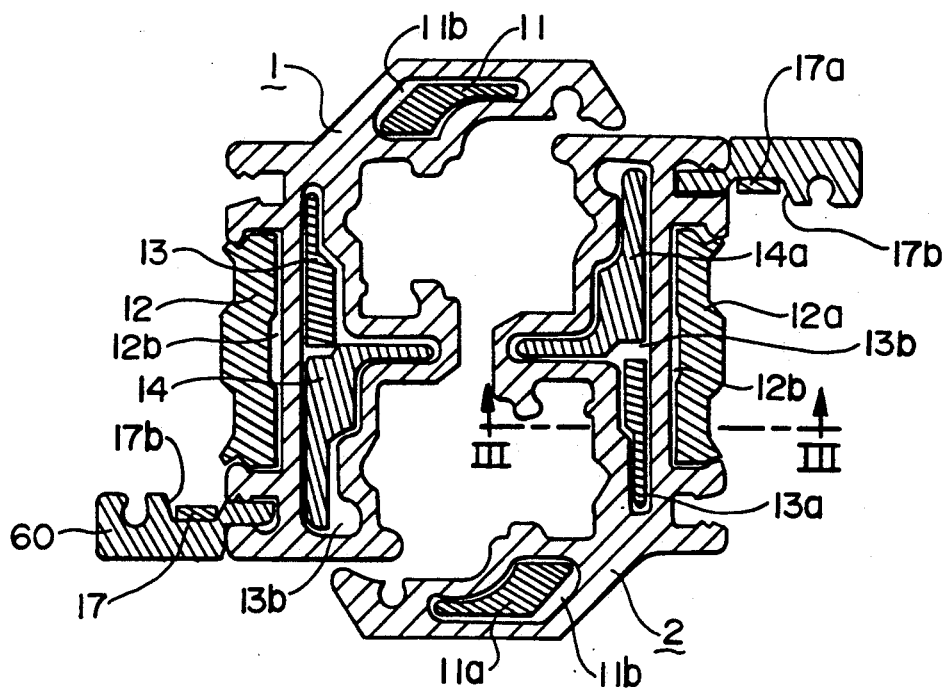
FIG. 2 shows said casing frame and said leaf frame in cross section along line II—II in FIG. 1.
Figure 3:
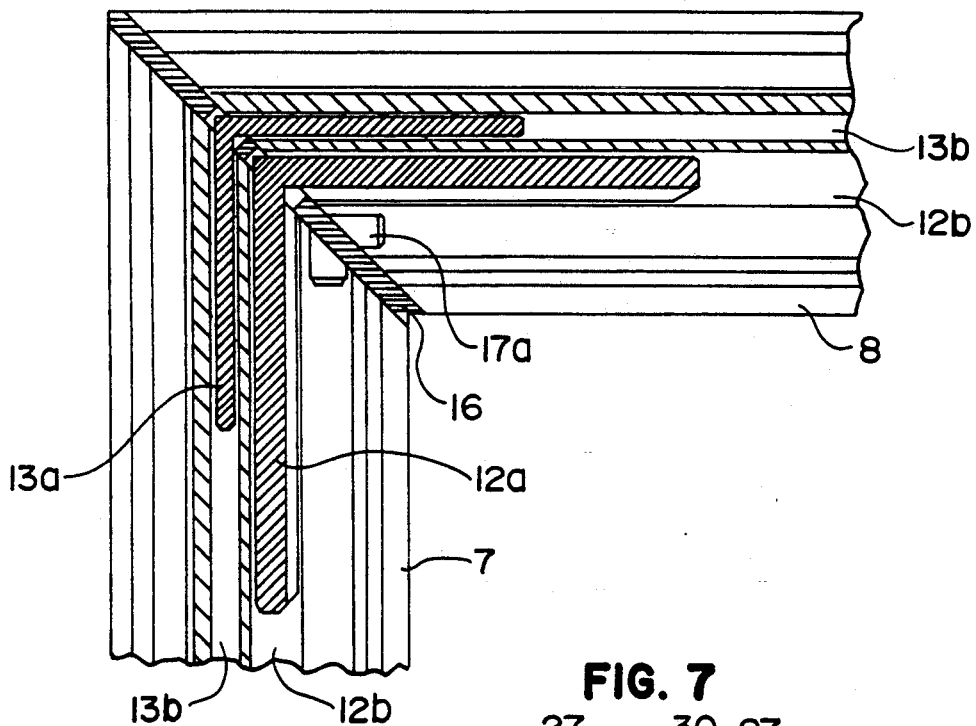
FIG. 3 shows the corner area of the leaf frame in cross section along line III—III of FIG. II.
Figure 5:
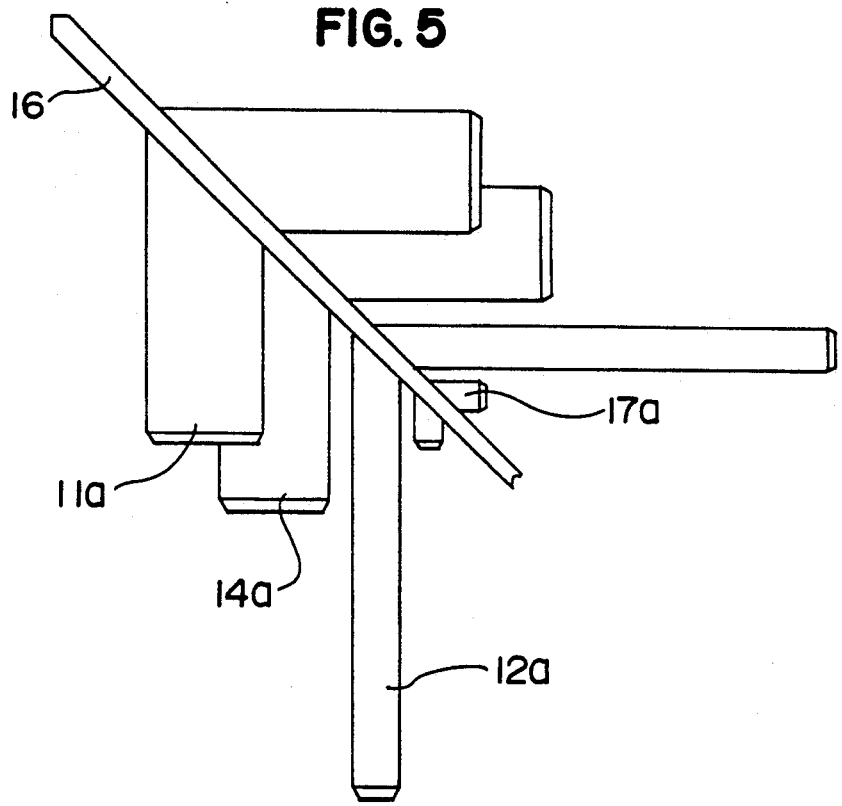
FIG. 5 shows a joint plate with corner connecting angler for the leaf frame in a view corresponding to that of FIG. 4.
Figure 4:
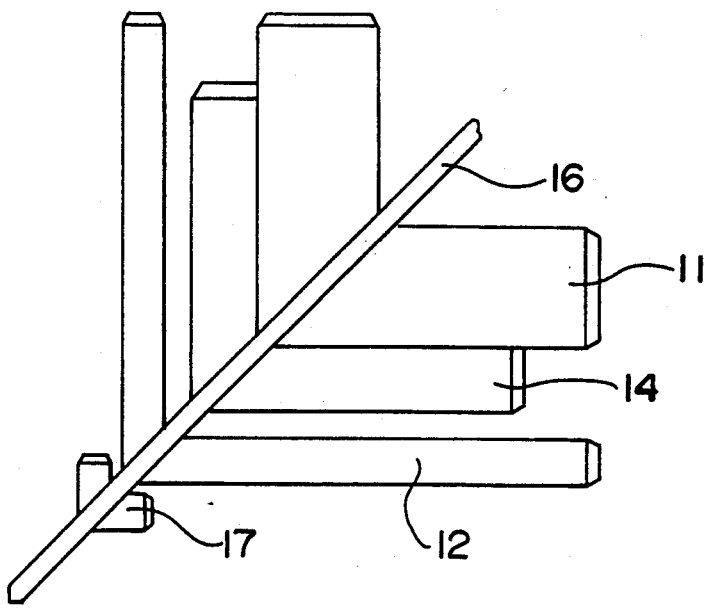
FIG. 4 shows a joint plate with corner connecting angler for the casing frame in a view perpendicular to the plane of the frame.

The frames shown in FIGS. 1 to 3, namely the casing frame 1 and the leaf frame 2, consist of hollow sections 3, 4, 5, 6 or 7, 8, 9, 10. The hollow sections are Duroplastic profiles reinforced with fibers extending in the longitudinal direction. Frames 1, 2 are joined in the frame corners 1a or 2a with corner connecting angles and with the aid of a binder. The corner connecting angles are inserted in the open hollows 12b, 17b and in closed hollows 11b, 13b of the hollow sections. For connecting the frame corners 1a of the casing frame, corner connecting angles 11, 12, 17, 13, 14, and for connecting the frame corners 2a of the leaf frame 2, corner connecting angles 11a, 12a, 13, 14a, 17a are inserted in the hollows 11b, 12b, 13b. Joint plates 16 are disposed in connecting joints 15 of the casing frame 1 or in connecting joints 15a of the casing frame 2, and the corner connecting angles and the joint plates are integrated with each other as one-piece bodies. Embodiments of such bodies are shown in FIGS. 4 and 5. In this connection, the corner connecting angles and the joint plates can be pressed together of plastic or metal or injected. Preferably, such entities are of fiber reinforced thermoplastic; but also DUROPLASTIC come into consideration; also DUROPLASTIC can be reinforced with fibers.

Figure 6:
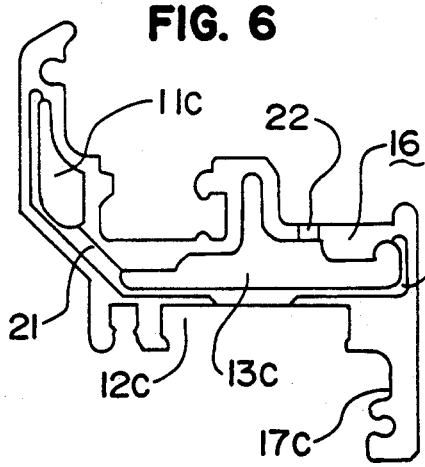
FIG. 6 is a joint plate for the leaf frame in a view in the longitudinal direction of the frame profile.

In the joint plates 16 are provided channels 20, 21, which form a connection of an opening 22 provided on the circumference of the corresponding joint plate to the places where the corner connecting angles are disposed. In the preferred case shown in FIG. 6, an opening 22 can be provided on the circumference of the joint plate, from which directly or indirectly extend channels 20, 21; but also several such openings can be disposed thus to provide several feed places for channels 20, 21; said channels then can be also separated from each other. A binder, such as glue or adhesive, introduced through the opening 22, can be injected particularly under high pressure into a split between the hollows 11b, 12b, 13b of the hollow sections and the corner connecting angles 11, 12, 13, 14, 17 or 11a, 12a, 13a, 14a, 17a inserted in said hollows, and also into the split between the joint plate 16 and the thereto butting against end areas of the hollow sections. Such opening 22 can be produced before or after the joining of the hollow sections with the body provided on the corresponding corner, integrated corner angles and the joint plate. This opening can, for example, be bored or milled. After the glue or adhesive composition is hardened, a firm connection is established of the there-located elements of the frame construction on the frame corners. In addition, the corner connecting angles can be joined with the hollow sections also by mechanical binders, such as, for example, screws or rivets. These binders can be so disposed that they extend from one corner connecting angles, traverse a wall of a hollow section, and then engage another corner connecting angles. Such technique achieves a particularly satisfactory anchoring of the T-pieces in the hollow sections.

The joint plates 16 cover the facing end areas 24 facing them of the hollow sections, and thus said end areas 24, where the ends of the reinforcing fibers lie free, are protected by the joint plates and by the glue or adhesive composition introduced in the gap 25 between the emd areas 24 and the joint plates 16. The joint plates extend until the sight areas 26 of the corresponding frame; it is particularly advantageous to provide the joint plates 16 on the circumference, namely at least on the circumferential sectors extending along the sight areas 26 of the corresponding frame with laterally extending edge ribs 27, which cover the hollow sections abutting the corresponding joint plate. For mechanical reasons and for achieving a pleasing appearance, it is advantageous if the joint plates have on their circumference an arched raised edge 30 extending transversely to the direction of the circumference, said edge having a side transition into the projecting edge ribs 27, as shown in FIG. 7.

Figure 8:
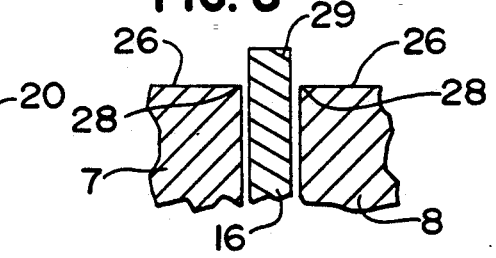

The said edge ribs 27 can be provided on the circumference of the joint plates 16 when they are produced. But it is also possible, when the joint plates are of thermoplastic, to first have them somewhat greater and to set them in such form between the to be interlinked hollow sections, so that the circumference 29 of the joint plate 16 extends beyond the circumferential edges 28 of the hollow sections, as shown in FIG. 8, and then to heat the circumference of the joint plates and press down, so that the heated material of the joint plates flows over the circumferential edges 28 of the end area 24 of the hollow sections; thus are produced edge ribs 27, which overlap or cover the circumferential edges 28. This can also accomplish satisfactory balancing of machining tolerances. Joint plates of thermoplastic polyester are particularly suitable for such technique. The heating and pressing down the peripheral edge of the joint plates can be most simply carried out with the suitable heated tool. According to the shape of such tools, a flat circumferential edge can be produced, such as shown in FIG. 9, or also a raised arch edge according to FIG. 7.

In the embodiment shown in FIGS. 10 and 11 of a casing frame 1 with two leaf frames engaged in said casing frame, one of said leaf frames, namely frame 2, is in the shape of a conventional leaf frame, analogously as in FIG. 1, while the other leaf frame is a sheathing frame 35. This sheathing frame has a buffer on the side facing the leaf frame 2 for the leaf frame 2, as provided on the other three sides of the leaf frame 2 by the casing frame 1. The sheathing frame 35 is combined of hollow sections 36, 37, 38, 39, one of said sections, namely the sheathing piece 39, which lies on the side facing the leaf frame 2, is turned by 180° around its geometric longitudinal axis 40 relative to the position of the hollow section 37 opposite the sheathing piece 39. Thus the arm 42 of the sheathing piece 39 can form a buffer for the hollow section 7 of the leaf frame 2, analogously as the buffer formed by the arms 43 of the hollow section of the casing frame 1 for both leaf frames 2, 35. The resulting position of the sheathing piece 39 relative to an adjoining hollow section of the sheathing frame 35 is directly seen in FIG. 12.

The mitre joints 44 located at the ends of the sheathing piece 39 extend only over a portion of the width of the profile 46 adjoining the inside 45 of the frame 35 and the hollow sections 39, 38 or 39, 36 interlinked on these mitre joints 44 away from the outer end of the mitre joints 44 are ending with plane end areas 49, 50, which extend transversely to the longitudinal axis of the corresponding hollow sections 39, 38, 36. The joint plates 16 disposed in the mitre joints 44 on the outer ends 47 of the mitre joints 44 adjoiningly have each two plate portions 51, 52 extending at right angles to each other and adjoining the plane end areas 49, 50. The edge 53 of the plate portions 51, 52 extends at least on the outer or side areas 26 of the profiles 39, 38, 36 alongside the edge 55 of the plane end areas 49, 50 of the hollow sections 39, 38, 36. Plate portions 51, 52 project on the inner side of the hollow sections partly a little over the individual profiled recesses of these hollow sections. The plate portions 51, 52 continue in transition into a profiled transition body 57 between said plate portions, the profile of said body being toward one side aligned flush with the profile of the sheathing piece 39 and toward the other side with the profile of the other hollow section 38 or 36 on said sheathing corner, as shown in FIG. 13.

Buffers are expediently provided on said plate portions and inserted in the hollows of said hollow sections for joining tightly plate portions 51, 52 with the hollow sections present on the corresponding corner of the sheathing frame; said buffers improve the hold of the said plate portions 51, 52 with the hollow sections and also improve the firmness of the corner connection by joining said plate portions 51, 52 to each other over the transition body 57 also in connection with the arms of the corner connecting angles. Such buffer on the plate portion 51 together with such buffer on the plate portion 52 provides the corner angle. A glue or adhesive mass is introduced into the gap between these elements for connecting the plate portions 51, 52 or the thereon disposed buffers with the hollow sections; additionally, if need be, for such connection can also be used mechanical connectors such as, for example, screws or rivets.

For achieving an exact positioning of the ends of the hollow sections projecting on the corners of the frame, it is expedient, as illustrated by corner connecting angles 12, 12a, to provide corner connecting angles disposed on a place on the circumference of the profile cross section of both hollow sections joined at the corresponding corner of the leaf. Such arrangement of at least one corner angle provides the advantage of convenient accessibility, which is particularly important when such corner angle is to be fastened by mechanical fasteners, such as screws or rivets; another advantage is that abutment areas can be simply and with a narrower tolerance machined on the piece 39 relative to the other hollow sections 36, 37, 38 of the sheathing frame 35, it is expedient for the accessibility to the inside of the frame for inserting glass or the like if at least one, but preferably both, holding cleats 60 are additionally inserted into the hollow pieces forming the frame, as shown in the drawing. By means of mitre joints provided in the corner of the frame, such cleats are form-closedly secured against unintended detachment.

We claim:

1. A casing frame for use as door and window leaves or casements, whose profiles are particularly of DUROPLASTIC comprising hollow sections and a plurality of corner connecting means joined by a binding medium, and a plurality of joined plates being disposed in linking mitre joints of corners of the frame and integrated with said corner connecting means; wherein each of said corner connecting means comprises a plurality of corner connecting angles being disposed on each said joined plate, at least one of said corner connecting angles being disposed at a place on circumference of profile cross-section of the hollow sections at a corresponding corner of the frame, at least another corner connecting angle being inserted in a closed hollow of the hollow sections gripped together at the corresponding corner; and wherein on each of said joint plates are provided channels leading to the places where the corner connecting angles are disposed, said channels being connected to each other and to at least one opening on circumference of the joint plate.

2. The casing frame according to claim 1, wherein the joint plate extends up to sight areas of the frame.

3. The casing frame according to claim 2, wherein the joint plate has on its circumference, namely at least on the circumferential portions extending along the sight areas of the frame, laterally projecting edge ribs which cover circumferential edges of the hollow sections.

4. The casing frame according to claim 3, wherein the joint plate has an edge raised and arched transversely to the circumferential direction and laterally passing over into the projecting edge ribs.

5. The casing frame according to claim 1, wherein the joint plate is of thermoplastic, preferably thermoplastic polyester.

6. The casing frame according to claim 1, wherein the frame is a rectangular sheathing frame assembled of hollow sections of equal cross section, one of the hollow sections, namely a sheathing piece is turned by 180° along its geometrical longitudinal axis relative to another hollow section opposite the frame, the mitre joints located at ends of the sheathing piece extend only over part of width of the profile abutting the inside of the frame, and areas outwardly adjoining the mitre joints of the hollow sections joined on said mitre joints are ending away from an outer end of the mitre joints with plane end area transversely extending to the longitudinal axis of the corresponding hollow sections, and the joint plates on both mitre joints located at the ends of the sheathing piece abut two respective plate parts extending at right angles to each other, said plate parts abut the plane end areas of the hollow sections extending transversely to the longitudinal axis of the corresponding hollow sections and are connected to these end areas.

7. The casing frame according to claim 6, wherein edges of the plate parts follow edges of the end areas of the hollow sections at least on outer and sight areas of the frame.

8. The casing frame according to claim 6, wherein the plate parts are connected to each other via a profiled transition body located between said plate parts; a contour of said transition body being aligned toward one side with a profile contour of the sheathing piece and toward the other side with a profile contour of the other hollow sections on said outer end of the mitre joints.

9. The casing frame according to claim 6, wherein a plurality of lugs extend from the plate parts abutting the end areas of the hollow sections, said lugs being inserted into the hollows of said hollow sections.

10. The casing frame according to claim 6 or 9, wherein the hollow section on the side facing the inside of the frame has two holding cleats for holding a glazing, and at least one, but preferably both holding cleats are additionally inserted into the hollow sections forming the frame.

11. The casing frame according to claims 16 or 6, wherein one of the corner connecting angles disposed at the place on the circumference of the profile cross section of both hollow sections sits on a place on the inner side of the frame of the circumference of the profile cross section.

* * * * *